United States Patent [19]

Rivkin

[11] Patent Number: 4,728,068
[45] Date of Patent: Mar. 1, 1988

[54] REMOVABLE ANCHORS FOR PERFORATED PANEL HANGERS

[75] Inventor: Bernard Rivkin, Poway, Calif.
[73] Assignee: PPMD, Inc., Del Mar, Calif.
[21] Appl. No.: 768,676
[22] Filed: Aug. 23, 1985
[51] Int. Cl.[4] ............................................. E04G 3/00
[52] U.S. Cl. .................................. 248/220.4; 24/339; 24/453; 24/297; 24/616; 24/606; 411/344
[58] Field of Search ............... 248/220.4, 220.3, 221.2; 24/305, 339, 453, 297, 458, 573, 616, 606; 411/508, 509, 510, 340–346, 15

[56] References Cited

U.S. PATENT DOCUMENTS

| | | | |
|---|---|---|---|
| 1,242,569 | 10/1917 | McDonald | 411/344 |
| 3,288,014 | 11/1966 | Mortensen | 411/344 |
| 3,423,055 | 1/1969 | Fisher | 24/339 X |
| 3,651,545 | 3/1972 | Hara | 24/305 |
| 3,701,302 | 10/1972 | Pestka et al. | 411/15 |
| 3,777,052 | 12/1973 | Fegen | 24/305 X |
| 4,125,048 | 11/1978 | Hardin | 411/344 |
| 4,131,258 | 12/1978 | Okuda et al. | 24/339 X |
| 4,312,487 | 1/1982 | Kimura | 24/339 X |
| 4,441,680 | 4/1984 | Rivkin et al. | 248/220.4 |

FOREIGN PATENT DOCUMENTS 251754  5/1926  United Kingdom ................ 411/344

Primary Examiner—Ramon S. Britts
Assistant Examiner—Blair M. Johnson

[57] ABSTRACT

Removable anchors provide for the stabilization and securing of perforated panel hangers, on a semi-permanent basis, through the use of a formed semi-rigid anchor member inserted into one or more apertures of a perforated support panel, embracing at least a portion of the body or shank of at least one hanger and includes at least one end portion designed with one or more deformable barbs to which pull tab members are attached. After being inserted through the aperture of the perforated panel, without special tools, anchor barbs return to original shape locking behind the panel, the pull tab member extending through panel aperture to remain in front of perforated panel. When hanger removal is desired, pull tab elements attached to the anchor barbs are pulled and latched from the front of the perforated panel, causing the compacting of the anchor barb portions, they fold against the anchor body allowing anchor to exit through the panel perforation. The stabilizing anchor is preferably fabricated of a thermoplastic material which provides a resilience and memory adapted to this application. The anchor member may be molded separately or fashioned directly onto a hanger fixture.

8 Claims, 11 Drawing Figures

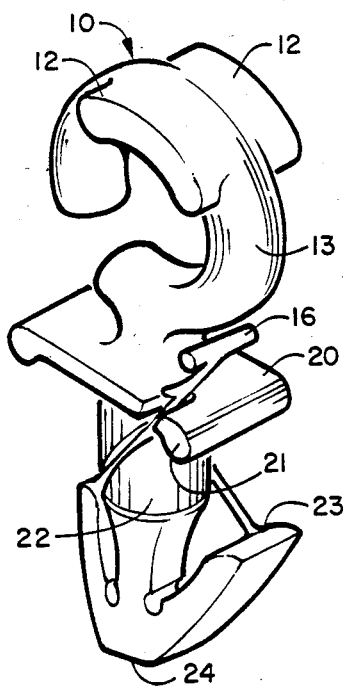
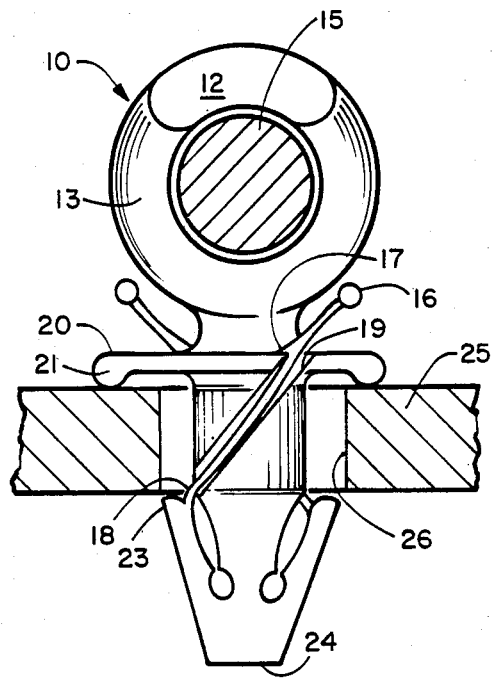
FIG. 7
FIG. 8
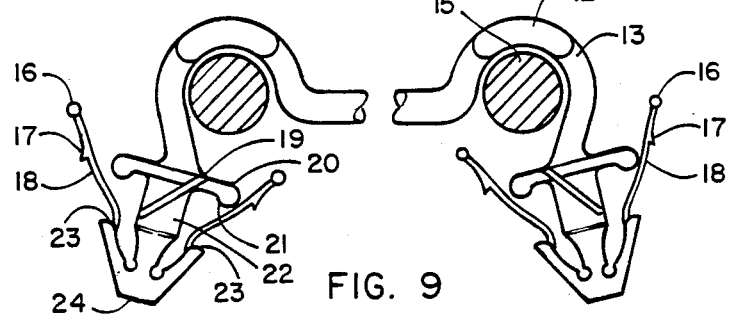
FIG. 9
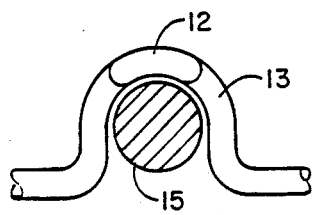
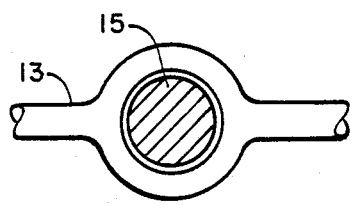
FIG. 10
FIG. 11

REMOVABLE ANCHORS FOR PERFORATED PANEL HANGERS

BACKGROUND OF THE INVENTION

1. Field of the Invention

The present invention relates to anchor members for removably securing hangers as generally employed on perforated panel support systems.

2. Description

Hangers associated with article supporting means as used in perforated panels are relatively common. Hangers for such perforated panel systems take many shapes and forms determined by the nature of the articles to be supported. Most such hangers embody a single wire forming an extended body or shank with an article supporting extension forwardly from the lower end of the body, and the upper end of the body provides an anchoring means in the form of one or more bent offsets, which are inserted rearwardly through selected apertures and then pivoted downwardly into operating position. The wire diameter is determined by the perforated panel aperture size.

Although the perforated panel system is well known and widely used there are inherent problems which cause dissatisfaction in operation. The instant invention corrects these problems.

In the practice of the present systems using bent wire hangers or brackets in combination with perforated panel systems, it has been found that when an article is put in place on or is removed from the typical hangers, the hanger often shifts laterally, or moves forward, dislocating itself from the panel with the article being removed. This undesired displacement has been addressed by various forms of stabilizers with limited success. Some stabilizing means take the form of projecting lugs integral with the body, adapted to fit into an adjacent aperture, with or without frictional attachment in order to stabilize. Although this is the most common approach, it is unsatisfactory because the manufacturing tolerances allowable for the aperture sizes in the perforated panels of different types and various manufacturers, manufacturing tolerances allowable by different fixture manufacturers, wear and tear and weathering, all influence the frictional fit without which stabilizing performance is extremely limited. In those cases where the aforementioned fit is acceptable initially after several insertions and removals in certain types of panels such as hardboard, this relationship is no longer satisfactory. Other methods being practiced to overcome this problem are the use of two or more part units which require time, effort, and proper assembly, on stabilizers and hangers which are costly to manufacture.

Of the devices known, the anchoring system closest to the present invention in spirit is the Rivkin U.S. Pat. No. 4,441,680, co-granted Apr. 10, 1984 to the applicant of the present application.

SUMMARY OF THE INVENTION

The present invention is concerned with the stabilization and securing of perforated panel hangers, on a semi-permanent basis, through the use of a formed semi-rigid anchor member inserted into one or more apertures of a perforated support panel, embracing at least a portion of the body or shank of at least one hanger and includes at least one end portion designed with one or more barbs which return to original disposition after being inserted through the aperture of the perforated panel. When hanger removal is desired, pull tab elements attached to the anchor barbs are pulled and latched, causing the compacting of the anchor barb portions, as they fold against the anchor body allowing anchor egress through the perforation. The stabilizing anchor may be unlatched, reset and reused on many occasions without significant deterioration. The stabilizing anchor is preferably fabricated of a thermoplastic material or semi-rigid rubber type material, which provide a resilience and memory adapted to this application. Though the embodiment described and illustrated herein may describe a separate anchor member, it should be understood that the anchor member may be molded or fashioned directly onto a hanger fixture. This may be done by inserting the hanger fixtures into the anchor forming mold prior to the flow of plastic or other semi-hard material, or the hanger fixture may be inserted into a casting mold prior to the input of the anchor forming material.

An object of the invention is to provide a formed anchor member by means of which a supporting hanger may be held against forward or lateral displacement with respect to its normal location on a perforated support panel.

Still another object of this invention is to provide a formed anchor member that may be readily and easily put into place in a perforated panel aperture without special tools and removed non-destructively from that aperture, when desired, without tools.

Another object of the invention is to provide a formed anchor member that may be economically manufactured using the special characteristics of thermoplastic materials, or other semi-rigid rubber type material.

A still further object of this invention is to provide an anchor member that is adaptable for use with conventional perforated support panels and hangers.

Other and further objects of the invention will be apparent from the following description, drawings and claims, which, by way of illustration, show a preferred embodiment of the present invention and the principles thereof. Other and different embodiments of the invention employing equivalent principles with structural changes may be made as desired by those skilled in the art without departing from the spirit of the invention.

IN THE DRAWINGS

FIG. 7 shows a perspective view of the anchor with the one pull tab element extended and latched causing the compacting of the anchor leg as the barb folds against the leg.

FIG. 8 is a plan view showing both barbs of the anchor leg compacted by the action of latched pull tab elements allowing withdrawal of the anchor from the panel perforation, shown in cross section.

FIG. 9 is a plan view of a third embodiment showing a double legged anchor.

FIG. 10 and FIG. 11 are fragmentary views showing central insertion portions to be incorporated into FIG. 9.

DETAILED DESCRIPTION OF THE DRAWINGS

Figure 1:
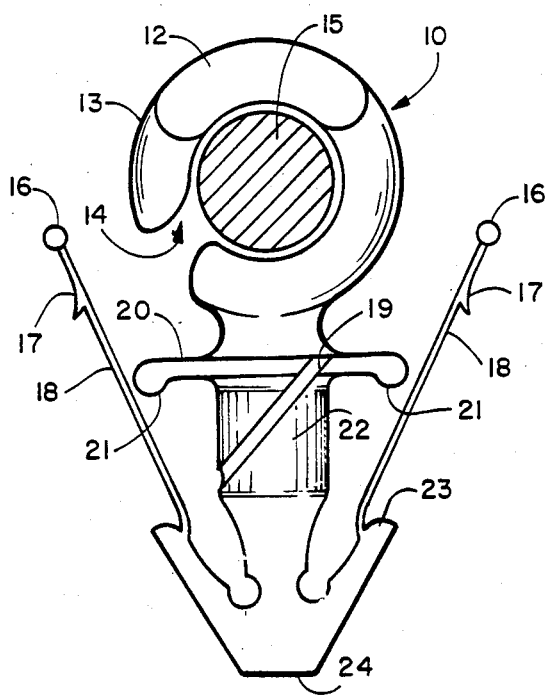
FIG. 1 depicts a plan view of a first embodiment of the perforated panel hanger anchor of the invention.
Figure 2:
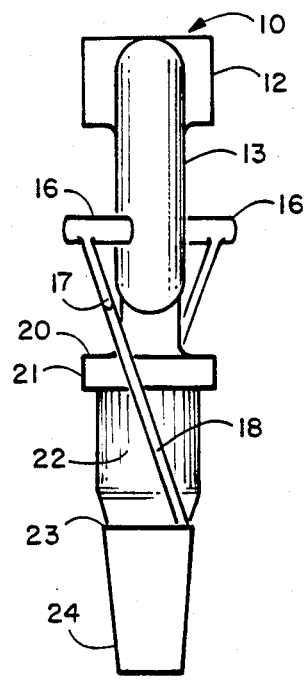
FIG. 2 depicts a side view of the anchor of FIG. 1.
Figure 3:
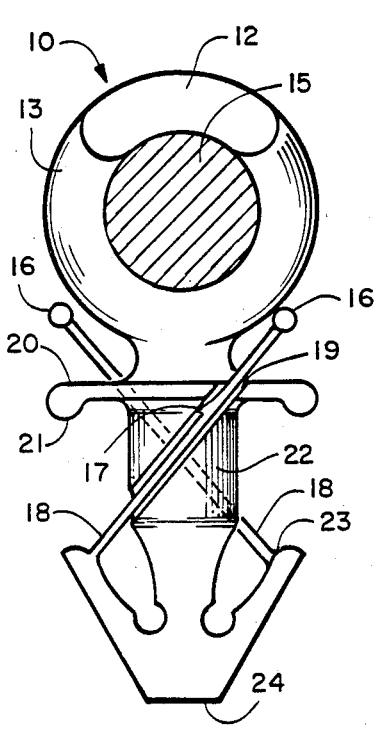
FIG. 3 is a plan view showing a second embodiment with anchor member formed in attachment to a hanger, with pull tab elements in place, ready for panel insertion.
Figure 4:
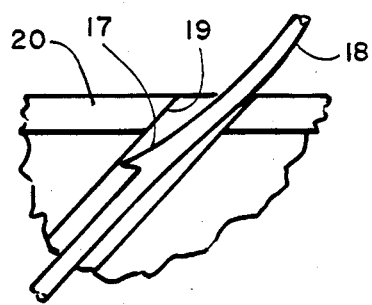
FIG. 4 is a fragmentary plan view of the anchor section showing pull tab latching hook in rest position.
Figure 5:
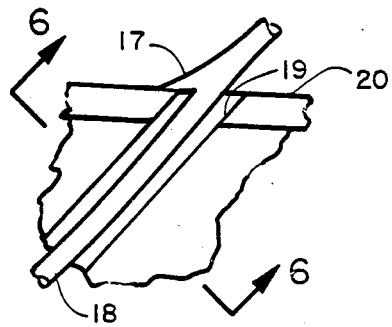
FIG. 5 shows a fragmentary plan view showing the pull tab latch hook in its latched position.
Figure 6:
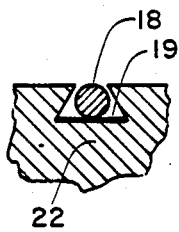
FIG. 6 is fragmentary top cross section view of the anchor showing the pull tab element in the tab channel with undercut.

Referring to the FIGS. 1 through 4 wherein the reference numeral 10 generally denotes an embodiment of the perforated panel hanger anchor. The anchor 10 is preferably molded of a thermoplastic or semi-hard rubber material. The anchor is formed to provide an open curvilinear portion 13 for at least partially embracing a perforated panel hanger 15. A tensioning ledge 20 is provided to maintain tension of the anchor against the perforated panel, between tensioning tips 21 and barb tips 23. The tensioning ledge also provides a holding place for pull tab latching hooks 17. Pull tab elements 18 are formed extending from the internal face of the anchor barbs 23 and include latching hooks 17 and tab handles 16. Pull tab channels 19 are formed in the anchor body preferably incorporating an undercut as shown in FIG. 6. Extension shoulders 12 are formed preferably on top and bottom of the curvilinear portion 13 for increased hanger stabilization. FIGS. 1 and 2 show the anchor prior to preparation for insertion into a perforated panel. FIG. 2 shows pull tab elements 18, prior to insertion into the pull tab channel 19, formed to provide tensioning load into pull channel 19. FIG. 3 shows pull tab elements 18 inserted into channel 19 ready for installation of the anchor into a perforated panel aperture. FIG. 4 shows a portion of the pull tab element 18 including the latching hook 17 in pull tab channel 19 in the at rest condition. FIG. 5 shows fragmentary portion of pull tab element 18 including pull tab latch 17 in latched position against tensioning ledge 20. FIG. 6 is a fragmentary cross sectional top view of the anchor showing pull tab element 18 inserted into pull tab channel 19 illustrating the tensioning of pull tab element 18 and also the preferred undercut configuration. FIG. 7 shows the latching hook holding on the tensioning ledge causing a compaction of the barb on the anchor leg. FIG. 8 shows a plan view of the anchor with both barbs compacted by the latching of the pull tab elements 18 permitting withdrawal of the anchor through the panel perforation, which is shown in cross section. FIG. 8 also shows the side view of the tensioning ledge and tensioning tips 21 illustrating the tension adjusting ability in association with barb tips 23 and also to accomodate the latching of the pull tab element 18 when barb tip compacting is required for removal from perforated panel. FIG. 9 shows an anchor embodiment provided for a two legged hanger. FIG. 10 or FIG. 11 when incorporated into FIG. 9 provides for the securing of a three legged hanger. FIGS. 1, 2, 3, 7, 8, 9 and 10 show extension shoulder 12 which is a preferred embodiment increasing holding area against hanger legs.

Referring to the description and drawings, it should now be apparent that the instant invention provides a stabilizing and securing anchor for hangers used in perforated panel systems, that is positive, and yet may be intentionally removed and reused, without tools or significant deterioration. It will also be evident that the present invention may be economically fabricated using conventional methods and materials.

While preferred embodiments of the invention have been illustrated herein, it is to be understood that changes and variations may be made by those skilled in the art without departing from the spirit and scope of the instant invention.

What is claimed is:

1. A removable and reusable anchor which when inserted through at least one perforation of a perforated panel has surfaces on opposite sides thereof for securing and stabilizing perforated panel hangers to said perforated panel said panel having opposing surfaces, said anchor comprising:
    a body member having upper and lower ends and two opposing resilient barbs, said barbs having a first end and a second end, said first end extending upwardly away from said lower end of said body member for engaging one of said opposing surfaces of said perforated panel and a resilient base member on the opposite, upper end of said body for engaging the other opposing surface of said perforated panel including a perforated panel hanger attaching means, said body and base member having elongated slots on opposite sides thereof extending angularly across said body member and being partially open along the length thereof;
    pull tab means formed and originating from the second end of said resilient barbs, said pull tab means being located within said slots and extending angularly across said body member and extending through said panel perforations and at least one of said base member slots said body member, base member, barbs and pull tabs being molded and of one piece construction;
    whereby when said anchor is pressed through a panel perforation said resilient base member and resilient barbs engage opposite sides of said perforated panel locking said anchor to said panel, and when said pull tab means are pulled upwardly said resilient barbs are pulled against said body member and said anchor can be removed from panel perforation for subsequent reuse.

2. The invention as defined in claim 1 wherein said pull tab means include locking means in the form of latching hooks for engaging an edge of their respective slots for locking said pull tabs to said base member when said barbs are positioned adjacent to said body member for anchor removal.

3. The invention as defined in claim 1 wherein the pull tab means are formed to provide directional stress into the slots to be retained therein until intentionally removed.

4. The invention as defined in claim 2 wherein the pull tab means may be unlatched, allowing the barbs to be restored to their original position through material memory, by moving the pull tab latching hook laterally in the base member slots, disengaging it from the base member thereby releasing barb holding tension.

5. The anchor as defined in claim 1 wherein a hanger holding means is formed on the upper end of the body member to at least partially surround a portion of the said perforated panel hanger for securing and stabilizing said panel hanger through at least one perforation of a perforated panel.

6. The invention as defined in claim 5 wherein an anchor attaching means is formed and is curvilinear and at least semi-circular around at least one portion of said panel hanger for securing and stabilizing said hanger through at least one perforation of said perforated panel.

7. The invention as defined in claim 5 wherein said anchor is formed at least partially attached to said panel hanger.

8. A removable and reusable anchor which, when inserted through at least two perforations of a perforated panel, has surfaces on opposite sides of each perforation for securing and stabilizing perforated panel hangers to said perforated panel, said panel having opposing surfaces, said anchor comprising:

two body members each having upper and lower ends, at least one resilient barb extending upward away from the lower end thereof, said barbs having first and second ends, the first end of said barbs engaging one of said opposite surfaces of said perforated panel and a resilient base member on the upper end of each said body member for engaging the other opposite surface of said perforated panel, said body base member having elongated spaced apart slots on opposite sides thereof extending angularly across said body member and being partially open along the length thereof; pull tabs attached to said first ends of said resilient barbs, said pull tabs extending angularly across said body member within said slots for extending through said panel perforations said body member, base member, barbs and pull tabs being molded and of one piece construction; said body members being formed in a spaced apart relationship with a joining member formed to surround at least one element of a perforated panel hanger whereby when said body members are inserted through at least two perforated panel perforations, said perforated panel hanger is secured to said perforated panel.

* * * * *